United States Patent [19]
Takeyama et al.

[11] Patent Number: 6,034,209

[45] Date of Patent: Mar. 7, 2000

[54] METHOD OF RECOVERING LOW-BOILING SUBSTANCES FROM A POLYMER LATEX

[75] Inventors: Youichi Takeyama, Takaoka; Masahiro Yoshida, Yokohama, both of Japan

[73] Assignee: Shindai-Ichi Vinyl Corporation, Tokyo, Japan

[21] Appl. No.: 09/029,286

[22] PCT Filed: Mar. 28, 1997

[86] PCT No.: PCT/JP97/01086

§ 371 Date: Jul. 20, 1998

§ 102(e) Date: Jul. 20, 1998

[87] PCT Pub. No.: WO97/36940

PCT Pub. Date: Sep. 10, 1997

[30] Foreign Application Priority Data

Mar. 29, 1996 [JP] Japan ................................. 8-103611

[51] Int. Cl.⁷ ........................................................ C08F 6/10
[52] U.S. Cl. ..................... 528/500; 528/501; 528/502; 523/328; 526/344
[58] Field of Search ..................... 528/500, 501, 528/502; 523/328; 526/344

[56] References Cited

U.S. PATENT DOCUMENTS 4,158,092   6/1979   Botsch ..................................... 528/500
4,247,686   1/1981   Takemoto ............................... 528/501

FOREIGN PATENT DOCUMENTS 268021   1/1996   Switzerland.

*Primary Examiner*—James J. Seidleck
*Assistant Examiner*—Olpa Asinovsky
*Attorney, Agent, or Firm*—Armstrong, Westerman, Hattori, McLeland and Naughton

[57] ABSTRACT

In a process for recovering low-boiling point substances wherein a low-boiling point substance-containing polymer latex is atomized from a nozzle equipped at the upper part of an evaporator to evaporate the low-boiling point substances, the polymer latex is atomized over the surface of a polymer latex retained in a first evaporator maintained at a pressure of 50 to 130 torr, and then, the polymer latex is atomized over the surface of a polymer latex retained in a second evaporator maintained at a pressure of 100 to 240 torr which is higher than that of the first evaporator; each of the polymer latexes to be atomized in the first and second evaporators is maintained at a temperature of 10 to 30° C. higher than the saturated steam temperature in the respective evaporator. By this process, low-boiling point substances such as unreacted monomer can be recovered with high efficiency from the polymer latex.

6 Claims, 2 Drawing Sheets

METHOD OF RECOVERING LOW-BOILING SUBSTANCES FROM A POLYMER LATEX

DESCRIPTION

Method of Recovering Low Boiling Substances from a Polymer Latex

1. Technical Field

This invention relates to a process and an apparatus by which low boiling point substances such as a vinyl chloride monomer and a chain transfer agent can be recovered or removed with high efficiency from a foamable polymer latex such as, for example, a latex of vinyl chloride polymer by using a continuous multi-stage evaporator.

2. Background Art

Polymer latexes such as a vinyl chloride polymer latex, a polystyrene latex and an acrylic rubber latex are widely used as, for example, coating materials, paints and materials to be incorporated with other polymers. As for a polyvinyl chloride resin for paste processing, a vinyl chloride polymer latex is dried to give a powder and the powder is mixed with a plasticizer or the like.

The above-mentioned polymer latexes are in the form of a dispersion comprising minute polymer particles having a particle diameter of 0.1 to 10 μm which are uniformly suspended in an aqueous medium. As typical methods for preparing the polymer latexes by polymerization, there can be mentioned an emulsion polymerization procedure, a seeding emulsion polymerization procedure and a microsuspension polymerization procedure. In these polymerization procedures, surfactants such as anionic surfactants and nonionic surfactants are usually used.

The thus-prepared polymer latexes contain residual ingredients such as low-boiling-point unreacted monomers, chain transfer agents such as t-dodecyl mercaptan and carbon tetrachloride, and solvents for free-radical initiators, such as n-hexane. Low-boiling point substances having a boiling point lower than that of water which are contained in the polymer latexes should preferably be recovered with high efficiency from the viewpoint of reduction of a raw material cost, quality and hygiene.

As processes for recovering low-boiling point substances, there can be mentioned, for example, a process for recovering unreacted monomers from a vinyl chloride polymer latex, wherein the polymer latex is retained in an evaporator, i.e., an evaporating vessel, in a continuous or batchwise manner where it is heated to evaporate unreacted monomers. However, a polymer latex having polymer particles having an average particle diameter of about 0.1 to 10 μm usually contains a surfactant, and thus, there is a problem such that the polymer latex readily foams from the latex surface within the evaporator with the result that polymer particles easily flow away therefrom through an unreacted monomer-recovering line (suction line). To suppress the foaming of polymer latex from the surface of latex, the amount of polymer latex and the rate of flow thereof are usually controlled, or the suction force through the unreacted monomer-recovering line is weakened. Therefore, other problems arise in that a substantial long time is required for recovering the unreacted monomers, and a polymer is deposited in a polymer latex-feeding line whereby the pipe line occasionally clogs. If the heating temperature in the evaporator is lowered, then the undesirable foaming can be suppressed, but this leads to reduction of recovery of the low-boiling point substances.

To solve the above-mentioned problems, a proposal has been made wherein a rotational disc-type defoaming device is provided inside or outside the evaporator. However, the vinyl chloride polymer contained in foams is deposited and, when the defoaming device is operated for a long period, the deposited polymer adheres onto and builds up on the inside of the defoaming device, which leads to stop of operation of the defoaming device.

A defoaming agent may be used instead of the defoaming device, but it readily thermally degrades the polymer when the polymer is processed at an elevated temperature. Further when the polymer is subjected to expansion molding, residual defoaming agent exerts a harmful influence upon the expansion and hence only a minor quantity of defoaming agent is used which is insufficient for suppressing the undesirable foaming of polymer latex within the evaporator.

As means for recovering unreacted monomers instead of the use of an evaporator, a method using a stripping column has been proposed in, for example, Japanese Examined Patent Publication No. 61-11241. This method is employed for a vinyl chloride polymer slurry prepared by a suspension polymerization procedure without the use of a surfactant. The stripping column used has a narrow space where foams can be retained, as compared with an evaporator, and therefore, the stripping column is not beneficial for the treatment of a foaming polymer latex.

If a continuous multi-vessel system comprising a plurality of evaporators is used, it is expected that the content of low-boiling point substances can be reduced to a level corresponding to the vapor-liquid-solid equilibrium concentration at certain pressure and temperature. However, the continuous multi-vessel system is generally not advantageous in equipment cost and maintenance cost, and hence in production cost. It is required that procedures for starting up or shutting down the continuous multi-vessel system are not complicated.

Therefore it is required that the continuous multi-vessel system comprise a fewer number of evaporators and low-boiling point substances can be reduced stably and with high efficiency.

DISCLOSURE OF INVENTION

In view of the foregoing, an object of the present invention is to provide a process and an apparatus for recovering low-boiling point substances from a polymer latex, by which low-boiling point substances such as an unreacted vinyl chloride monomer can be recovered with high efficiency through a stable operation from a foamable polymer latex such as a vinyl chloride polymer latex without substantial use of a defoaming agent and substantial use of a defoaming device, while undesirable foaming is suppressed.

In accordance with the present invention, there is provided a process for recovering low-boiling point substances from a foamable polymer latex wherein a foamable polymer latex containing low-boiling point substances is atomized from a nozzle equipped at the upper part of an evaporator to evaporate the low-boiling point substances for recovery, characterized in that, in a first evaporator maintained at a pressure of 50 to 130 torr, the low-boiling point substance-containing polymer latex is atomized over the surface of a polymer latex retained within the first evaporator, and then, in a second evaporator maintained at a pressure of 100 to 240 torr which is higher than that of the first evaporator, the polymer latex retained in the first evaporator is atomized over the surface of a polymer latex retained within the second evaporator; each of the polymer latexes to be atomized in the first and second evaporators is maintained at a temperature of 10 to 30° C. higher than the saturated steam temperature in the respective evaporator.

Preferably, the two polymer latexes flow toward the first and second evaporators at a flow speed of at least 0.5 m/sec, and the pressure of the first evaporator and the pressure of the second evaporator are maintained at 80 to 130 torr and 130 to 180 torr, respectively.

BEST MODE FOR CARRYING OUT THE INVENTION

Figure 1:
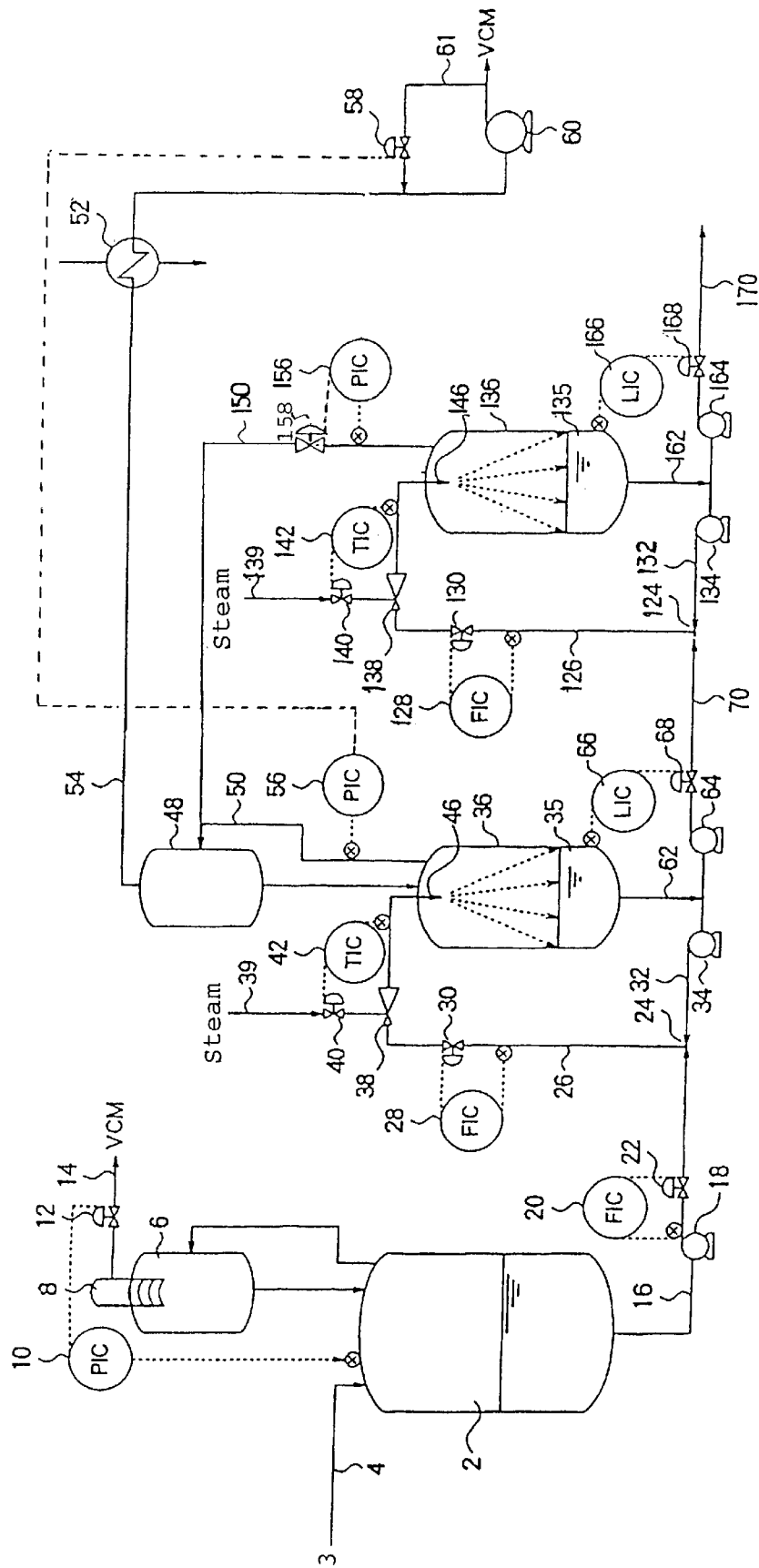
FIG. 1 is a flow diagram illustrating an example of arrangement of the apparatus used in the process of the present invention for recovering low-boiling point substances from a polymer latex.

The polymer latex used in the recovery process of the present invention is not particularly limited, but a vinyl chloride polymer latex is especially beneficially used.

By the term "vinyl chloride polymer" used herein we mean a polymer having at least 60% by weight of vinyl chloride monomer units, which includes a vinyl chloride homopolymer and a copolymer of vinyl chloride with other copolymerizable monomer or monomers. The vinyl chloride polymer latex usually contains 30 to 55% by weight of a vinyl chloride polymer, 0.1 to 4.0% by weight of an anionic surfactant and/or a nonionic surfactant, 68 to 46% by weight of water and 1.0 to 2.5% by weight of low boiling point substances such as unreacted vinyl chloride monomer, unreacted comonomers for a copolymer, a solvent for a free-radical initiator, and a chain transfer agent. The polymer particles in the latex have an average particle diameter of 0.1 to 10 μm.

As examples of monomers used for the preparation of polymers other than the vinyl chloride polymer, there can be mentioned vinyl halides such as vinyl fluoride, vinyl esters of a carboxylic acid such as vinyl acetate and vinyl propionate, vinyl ethers such as methyl vinyl ether, hydroxybutyl vinyl ether and cetyl vinyl ether, allyl compounds such as allyl chloride, allyl alcohol, allyl ethyl ether and allyl 2-hydroxyethyl ether, vinylidene compounds such as vinylidene chloride and vinylidene fluoride; esters of an unsaturated carboxylic acid such as monomethyl maleate, diethylmaleate, monobutyl maleate, butyl benzyl maleate, di-2-hydroxyethyl maleate, dimethyl itaconate, methyl acrylate, methyl methacrylate, ethyl acrylate, ethyl methacrylate, lauryl acrylate, lauryl methacrylate, 2-hydroxypropyl acrylate, 2-hydroxypropyl methacrylate, 2-N,N-dimethylaminoethyl acrylate and 2-N,N-dimethylaminoethyl methacrylate, unsaturated carboxylic acids and their anhydrides such as maleic anhydride, itaconic anhydride, maleic acid, fumaric acid, acrylic acid and methacrylic acid, amides of an unsaturated carboxylic acid such as N-phenylmaleimide, acrylamide and N-methylolacrylamide, olefins such as ethylene and propylene, unsaturated nitriles such as acrylonitrile and methacrylonitrile, aromatic vinyl compounds such as styrene, α-methylstyrene and p-methyl-styrene, and epoxy group-containing compounds such as glycidyl acrylate and glycidyl methacrylate. These monomers can also be used as comonomers for copomerization with vinyl chloride.

In a micro-suspension polymerization procedure, an oil-soluble free-radical initiator such as an organic peroxide is used. As the oil-soluble free-radical initiator is sensitive to temperature and impact and is readily exploded, it is usually stored as a solution in an organic solvent having a low-boiling point such as n-hexane or mineral spirit. Prior to initiation of polymerization, a monomer or monomers, a free radical initiator, a surfactant and optional chain transfer agent and other additives are incorporated in an aqueous medium to premix them, and then the pre-mixture is homogenized by a homogenizer to adjust the particle size of oil droplets. The homogenized liquid is fed to a polymerization vessel where the polymerization occurs usually at a temperature of 30 to 80° C.

As examples of the surfactant used, there can be mentioned anionic surfactants, which include alkylsulfate ester salts such as sodium lauryl sulfate and sodium lauryl myristylate; alkylarylsulfonate salts such as sodium dodecylbenzenesulfonate and potassium dodecylbenzenesulfonate; sulfosuccinate ester salts such as sodium dioctylsulfosuccinate and sodium dihexylsulfosuccinate; aliphatic acid salts such as ammonium laurate and potassium stearate; polyoxyethylene alkylsulfate ester salts; and polyoxyethylene alkyluslfate ester salts and polyoxyethylene alkylarylsulfate esters; and nonionic surfactants, which include sorbitan esters such as sorbitan monooleate and polyoxyethylene sorbitan monostearate; polyoxyethylene alkyl ethers and polyoxyethylene alkylphenyl ethers; and polyoxyethylene alkyl esters. These surfactants may be used either alone or in combination.

In evaporators, the polymer latex is stirred to remove the heat of polymerization. Usually when the polymerization is completed at a conversion of 85 to 99% to give a polymer latex comprising single particles having particle diameters of 0.2 to 5 μm.

In an emulsion polymerization procedure, a polymerization of a vinyl chloride monomer, which is emulsified with an emulsifier such as an anionic surfactant to be dispersed as micelles in an aqueous medium, is initiated by using a water-soluble radical initiator such as a persulfate salt. As the polymerization proceeds, the diameter of dispersed particles is increased and thus a minor amount of the surfactant is added to the polymerization system to stabilize the particles. The amount of the surfactant added should be minimum for the stabilization in order to prevent formation of new minute particles, and, during polymerization, to maintain the number of particles as formed in the initial stage. In general the particle diameter of polymer produced at a conversion of 85 to 99% by the emulsion polymerization procedure is very small, i.e., about 0.1 μm. In contrast, in the case where a vinyl chloride resin for paste processing, a polymer latex of polymer particles having an enlarged diameter, i.e., an average particle diameter of 0.4 to 0.6 μm is produced.

In a seeding emulsion polymerization procedure, a polymerization is initiated in the presence of a nucleus, which is a polymer particle prepared by an ordinary emulsion polymerization procedure or a micro-suspension polymerization procedure, by using a surfactant and a free-radical initiator, which are similar to those used in the above-mentioned emulsion polymerization, and the produced polymer particles are enlarged in an aqueous medium. The polymer particles made by the seeding emulsion polymerization procedure have an average particle diameter of 1 to 2 μm and contain minute particles having a particle diameter of about 0.2 μm, and thus exhibit a particle size distribution curve with sharp two peaks.

The process of the present invention will now be described specifically by the following embodiment wherein an unreacted vinyl chloride monomer is recovered from a vinyl chloride polymer latex.

In the process of the present invention, a vinyl chloride polymer latex containing low-boiling point substances such as a vinyl chloride monomer is atomized through a nozzle equipped at an upper part of an evaporator so that a large evaporation area is obtained by utilizing the property of the low-boiling point substances, i.e., a low boiling point (vinyl chloride has a boiling point of −14.0° C. at atmospheric pressure) and a high volatility. More specifically the polymer latex fed to the evaporator is heated at a temperature sufficiently high for volatilizing water in the polymer latex into steam (namely at a temperature 10 to 30° C. higher than the saturated steam temperature) and is atomized through a nozzle over the entire surface of a polymer latex retained in the evaporator. The unreacted monomer vaporized by atomizing is recovered through a recovering line by the suction of a compressor.

The heating of the polymer latex at a temperature 10 to 30° C. higher than the saturated steam temperature is preferably effected by introducing steam by an ejector into a polymer latex feed line leading to the atomizing nozzle. The polymer latex flows through the feed line to the atomizing nozzle preferably at a flow speed of at least 0.5 m/sec, more preferably at least 1.0 m/sec. Preferably a part of the polymer latex retained within the bottom portion of the evaporator is recycled into the polymer latex flowing through the feed line leading to the atomizing nozzle.

By maintaining the temperature of the polymer latex at the above-mentioned temperature, when the polymer latex is ejected from a nozzle, water and unreacted monomer contained therein are vaporized and thus the polymer latex is atomized to form a conical drizzle whereby fine drops of the polymer latex fall on the entire surface of the polymer latex retained in the evaporator. The fine drops of the atomized polymer latex suppress foaming from the free surface of the polymer latex, but unreacted monomer can be vaporized from the surface of the polymer latex and recovered through a recovering line with a high yield.

In the process of the present invention, the first evaporator is maintained at a pressure of 50 to 130 torr, preferably 80 to 130 torr for the following reason. If the first evaporator is maintained at a pressure lower than 50 torr, a vacuum pump of large capacity is required and thus power consumption is increased. Further, as the liquid temperature is lowered, the recovery of unreacted monomer is reduced. In contrast if the first evaporator is maintained at a pressure higher than 130 torr, the liquid temperature is increased, but the temperature of polymer latex is elevated to a temperature 10 to 30° C. higher than the saturated steam temperature at said pressure, and thus, the polymer latex is partially degraded to become creamy in the latex feed line with the result of deposition of polymer and clogging of the feed line, and deposition of scale on the inner wall of the evaporator.

In the process of the present invention, the polymer latex treated in the first evaporator is fed to the second evaporator. The second evaporator is maintained at a pressure higher than that of the first evaporator and in the range of 100 to 240 torr, preferably 130 to 180 torr. If the second evaporator is maintained at a pressure of 80 to 130 torr, i.e., a pressure similar to that of the first evaporator, a problem of operation does not arise and the concentration of residual unreacted monomer would be reduced to a level of 0.03 to 0.05 % by weight based on the polymer by the effect of increased number of stages. However, the concentration of residual unreacted monomer in the polymer latex fed to the second evaporator is lower than that in the polymer latex fed to the first evaporator, and therefore, even when the second evaporator is maintained at a temperature 10 to 30° C. higher than the saturated steam temperature at said pressure, a problem does not arise such that the polymer latex is partially degraded to become creamy in the latex feed line with the result of deposition of polymer and clogging of the feed line, and deposition of scale on the inner wall of the evaporator. By the elevation of temperature of the atomized polymer latex, the residual unreacted monomer is more readily vaporized and the concentration of residual unreacted monomer in the polymer can be reduced to a level smaller than 0.01% by weight (measurement limit).

According to the process of the present invention for recovering unreacted monomers, unreacted monomers such as an unreacted vinyl chloride monomer can be recovered with high efficiency from a foamable polymer latex such as a vinyl chloride polymer latex without substantial use of a defoaming agent and substantial use of a defoaming device, while undesirable foaming is suppressed.

The process of the present invention for recovering unreacted monomers from a polymer latex will now be described specifically and in detail by the following examples that by no means limit the scope of the claimed invention. Units occurring in the examples are by weight unless otherwise specified.

The concentration of unreacted monomer in a polymer latex was determined as follows.

Using a thermal conductivity detector gas chromatography, the measurement was conducted wherein isopropyl alcohol was used as an internal reference material. The column conditions were as follows.

Column: 10% PEG-20M chromosolve P (A.W) 30–60 mesh

Diameter: 4 mm

Length: 2 mm

Temperature: 120° C.

Injection temperature: 130° C.

Carrier: Helium 60 ml/min

A 50 ml Erlenmeyer flask was charged with about 40 ml of a vinyl chloride polymer latex containing a polymer at a concentration of c% and weighed (weight: w gr). The the flask was cooled in an ice-water bath, 1.0 ml of isopropyl alcohol was added into the flask, and the flask was gently shaken. Then 0.025 ml of the polymer latex was sucked by a syringe and immediately injected into the column for chromatography.

The concentration (X%) of vinyl chloride monomer in the polymer latex is calculated from the following equation.

$$X(\%)=[(A/W)/[(As/0.798)\times(c/100)]]\times 100$$

wherein F: factor of vinyl chloride which is 1.010 as isopropyl alcohol being 1.00

A: area of peak for vinyl chloride in gas chromatogram

As: area of peak for isopropyl alcohol in gas chromatogram 0.786: weight of 1.0 ml of isopropyl alcohol (gr)

In an apparatus, as illustrated in FIG. 1, used for carrying out an embodiment of the process of the present invention for recovering low-boiling point substances such as unreacted monomer from a polymer latex, a polymer latex prepared by, for example, a micro-suspension polymerization procedure is fed from a polymerization vessel 3 through a feed line 4 to a blow-down tank 2. The inside of the blow-down tank 2 is maintained at an absolute pressure of 836 to 1,064 torr. The polymer latex is temporarily reserved in the blow-down tank 2. Unreacted monomer (VCM) is separated from the polymer latex by a separator 6 equipped with a defoamer 8 comprising a plurality of conical rotational discs. A readily recoverable portion of the unreacted monomer is previously recovered through a first recovering line 14. A control valve 12 is provided in the first recovering line 14. The inner pressure of the tank 2 detected by a pressure gauge (PIC) 10, and the rate of flow in the first recovering line 14 is controlled by the valve 12 so that the inner pressure of the tank 2 is maintained at a constant value. Preferably unreacted monomer is recovered by volatilization caused by its self-pressure while foaming does not occur or occurs only to a negligible extent.

A first latex feed line 16 is connected to the bottom of the tank 2. The first latex feed line 16 is provided with a pump 18, a control valve 22 and a flowmeter (FIC) 20. A polymer latex from which a portion of the unreacted monomer has preliminarily been removed is fed through the first latex feed line 16 at a constant rate of flow to a stream-merging point 24. At the stream-merging point 24, a stream of the polymer latex fed through the first feed line 16 and a stream of a polymer latex through a recycle line 32 was merged, and the merged polymer latex is fed through a second latex feed line 26. The second latex feed line 26 is provided with a flowmeter (FIC) 28 and a control valve 30 so that the flow rate in the second latex feed line 26 is maintained at constant. An ejector 38 is provided in a part of the second latex feed line 26 located downstream from the control valve 30. In the ejector 38, steam is sucked through a steam feed line 39 and introduced into the polymer latex to heat the latex. By the steam introduced in the polymer latex, the temperature of the polymer latex is elevated to a temperature 10 to 30° C. higher than the saturated steam temperature. For controlling the temperature of polymer latex to said elevated temperature, the temperature of the polymer latex flowing from the ejector 38 through the second latex feed line 26 to a nozzle 46 is measured by a temperature gauge (TIC) 42, and, on the basis of the detected temperature, opening of a valve 40 provided in the steam feed line 39 is adjusted.

There is provided a two stage evaporator system, i.e., an first evaporator 36 and a second evaporator 136, downstream from the blow-down tank 2. The first and second evaporators 36 and 136 are equipped with nozzles 46 and 146, respectively, at an approximately center of the top of the respective evaporators. The structure of the nozzles 46 and 146 is not particularly limited, and, for example, is comprised of a short tube having a length of 300 mm and an inner diameter of 80 mm so that the polymer latex flows through each nozzle at a flow speed of 1.22 m/sec and a flow rate in volume of 22 m$^3$/h. The polymer latex 35 or 135 ejected through each nozzle 46 or 146 is capable of being retained within the bottom part of each evaporator 36 or 136. When the polymer latex is atomized, the temperature of the latex is immediately lowered and the polymer latex is retained at a temperature 15 to 25° C. lower than that before atomization. Therefore, the period during which the polymer latex is exposed to a high temperature is very short and thus the polymer is not subject to discoloration to any appreciable extent.

The polymer latex fed through the first latex feed line 16 from the blow-down tank 2 is introduced through the nozzle 46 into the first evaporator 36. An ejector 38 is provided in the first supply line 16 so that steam is sucked through a steam feed line 39 and incorporated into the polymer latex by the ejector 38 to heat directly the polymer latex. To control the polymer latex to a predetermined temperature, the temperature of the polymer latex flowing from the ejector 38 toward the nozzle 46 is measured by the temperature gauge (TIC) 42, and, on the basis of the detected temperature, opening of a valve 40 provided in the steam feed line 39 is adjusted.

To the bottom of the first evaporator 36, a drain line 62 is connected. The drain line 62 leads to a recycle line 32 and a third latex feed line 70. The recycle line 32 and the third latex feed line 70 are provided with pumps 34 and 64, respectively. By the recycle line 32, a part of the polymer latex 35 retained in the first evaporator 36 is recycled to the second feed line 26. By the third latex feed line 70, the other part of the polymer latex 35, from which an unreacted monomer has been recovered in the first evaporator 36, is fed through the stream-merging point 124 to the second evaporator 136. The third latex feed line 70 is provided with a control valve 68. The liquid level of the polymer latex 35 within the first evaporator 36 is detected by the level gauge (LIC) 66, and opening of the control valve 68 is controlled on the basis of the detected liquid level.

The third latex feed line 126 is provided with a flow gauge (FIC) 128 and a control valve 130 so that the flow rate of the polymer latex flowing through the third latex feed line 126 is maintained at constant. The third latex feed line 126 is further provided with an ejector 138, by which steam is sucked through a steam feed line 139 and introduced into the polymer latex to heat directly the polymer latex. To maintain the temperature of the polymer latex at a predetermined value, the temperature of the polymer latex flowing from the ejector 138 through the third latex feed line toward a nozzle 146 is detected by a temperature gauge (TIC) 142, and opening of a control valve 142 in the steam feed line 139 is controlled on the basis of the detected temperature.

To the bottom of the second evaporator 136, a drain line 162 is connected. The drain line 162 leads to a recycle line 132 and a fourth latex feed line 170. The recycle line 132 and the fourth latex feed line 170 are provided with pumps 134 and 164, respectively. By the recycle line 132, a part of the polymer latex 135 retained in the second evaporator 136 is recycled to the third feed line 126 through the stream-merging point 124. By the fourth latex feed line 170, the other part of the polymer latex 135, from which an unreacted monomer has been recovered in the second evaporator 136, is fed to the succeeding step, for example, a drying step. The fourth latex feed line 170 is provided with a control valve 168. The liquid level of the polymer latex 135 within the second evaporator 136 is detected by the level gauge (LIC) 166, and opening of the control valve 168 is controlled on the basis of the detected liquid level.

The upper parts of the first evaporator 36 and the second evaporator 136 are connected to a second recovering line 50 and a third recovering line 150, respectively, which lead to a separator 48. In the separator 48, a mixture of unreacted vinyl chloride monomer (VCM), steam and a polymer latex mist, which has been evaporated in the first evaporator 36 and the second evaporator 136 and recovered through the second and third recovering lines 50 and 150, is separated into the respective ingredients, and the separated polymer latex mist is recycled into the first evaporator 36. The separator 48 is connected to a fourth recovering line 54, which leads to a water-sealed compressor 60. A condenser 52 is provided in the fourth recovering line 54, by which steam is condensed to be separated. The unreacted monomer (VCM) is sucked by the compressor 60 to be recovered. In parallel to the flow-line having the compressor 60, a return line 61 is provided. In the return line 61, a control valve 58 is provided. The inner pressure of the first evaporator 36 is detected by a pressure gauge 56, and opening of the control valve 58 is controlled so that the inner pressure of the first evaporator 36 is maintained at constant. Similarly the inner pressure of the second evaporator 136 is detected by a pressure gauge 156 and opening of a control valve 158 is controlled so that the inner pressure of the second evaporator 136 is maintained at constant.

The invention will now be described more specifically by the following examples that by no means limit the scope of the invention.

Example 1

A vinyl chloride polymer latex, prepared by a microsuspension polymerization in a polymerization vessel, was treated by an apparatus illustrated in FIG. 1. The polymer latex was fed to a blow-down tank 2, and the inner pressure of the tank 2 was maintained at 0.3 kg/cm² (gauge pressure). In the tank 2, unreacted vinyl chloride monomer was preliminarily recovered. The polymer latex thus-obtained contained 48% by weight of a vinyl chloride resin having an average particle diameter of 1.0 μm, 0.34% by weight of anionic surface active agent, 50% by weight of water and 1.2% by weight of unreacted vinyl chloride monomer (VCM). Thus the amount of VCM based on the weight of the vinyl chloride resin was 2.5% by weight.

Each of a first evaporator 36 and a second evaporator 136 was charged with 1.0 m³ of water. The flow rate in volume of water through feed lines 26 and 126 was controlled to 22 m³/h. Steam was introduced in water through ejectors 38 and 138 to raise the water temperature. The temperatures at the ejectors 38 and 138 were preset at 70° C. (i.e., saturated steam temperature [52° C.]+18° C.) and 75° C. (i.e., saturated steam temperature [60° C.]+15° C.), respectively, and the water streams were warmed up. Thereafter the polymer latex was fed at a flow rate in volume of 6.0 m³/h through a feed line 16 and merged with water flowing through a recycle line 32, and the mixture was introduced into a feed line 26. The piping of the feed line spanning from the ejector 38 to a nozzle 46 and the piping of the feed line spanning from the ejector 138 to a nozzle 148 had an inner diameter of 80 mm and a length of 6,000 mm and the flow speed (linear speed) of water was 1.22 m/sec. The inner pressure of the evaporator 36 and the inner pressure of the evaporator 136 were preset at (110±7) torr and (150±7) torr.

Figure 2:
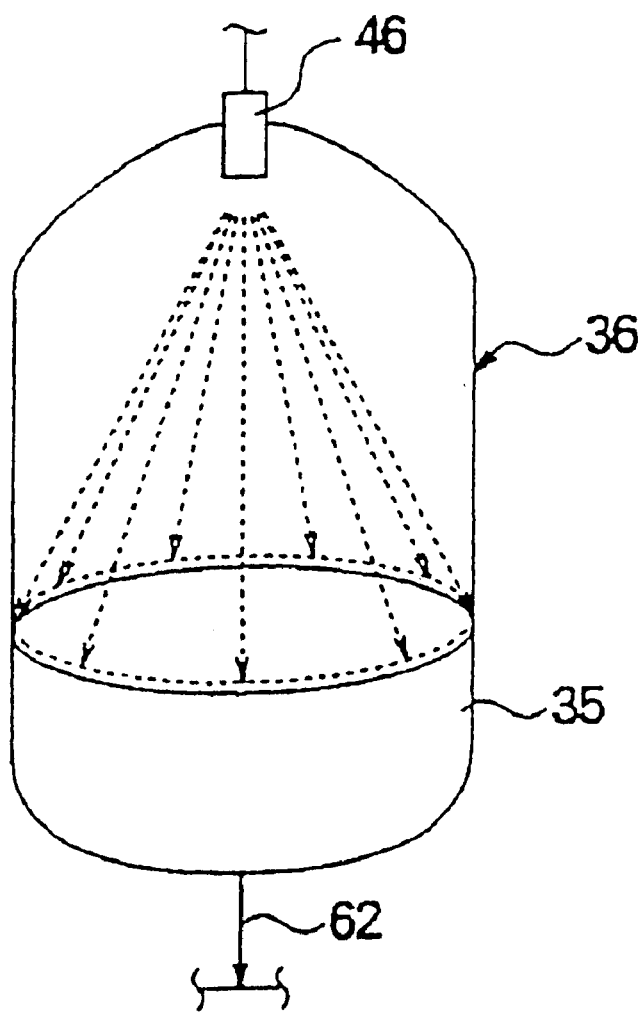
FIG. 2 is a schematic representation of an evaporator used as the first evaporator or the second evaporator shown in FIG. 1.

The inside of each evaporator 36 or 136 was observed through an inspection hole, and it was confirmed that the polymer latex atomized from the nozzle 46 or 146 having an inner diameter of 80 mm and a length of 30 mm formed a conical drizzle of fine drops falling over the entire surface of the polymer latex 35 or 135 retained within the evaporator 36 or 136, as illustrated in FIG. 2. The evaporators 36 and 136 had an inner diameter of 2,400 mm and a height of 3,400 mm.

As shown in Table 1, foaming on the surface of the polymer latex 35 or 135 was not observed.

A gas containing VCM, steam and a polymer latex mist, evaporated within each evaporator 36 or 136, was separated by a separator 48, and the separated polymer latex mist was recycled into the evaporator 36. The separated VCM and steam were fed to a condenser 52 where steam was condensed to be separated. The thus-recovered VCM was sucked by a compressor 60 and fed to a succeeding step of purifying and liquefying the recovered VCM.

In this operation, the level of the polymer latexes 35 and 135 within the evaporators 36 and 136 were adjusted to 25% of the entire height of each evaporator. When the working conditions became steady state, samples of the polymer latexes were collected from withdrawing lines 70 and 170 and the concentrations of unreacted vinyl chloride monomer (VCM) in the collected polymer latexes were measured. As seen from Table 1, the concentrations of VCM in the polymer latexes collected from the lines 70 and 170 were 0.15% by weight and 0.02% by weight, respectively, based on the weight of the vinyl chloride resin. When the frequency of clogging of the feed line spanning from the ejector 38 to the nozzle 46 was evaluated, clogging did not occur over a period of more than 800 days. When the frequency of clogging of the feed line spanning from the ejector 138 to the nozzle 146 was evaluated, clogging did not occur over a period of more than 100 days.

TABLE 1

|  | Example 1 | | Example 2 | |
| --- | --- | --- | --- | --- |
| Evaporator *1 | E1 | E2 | E1 | E2 |
| Latex before treatment | | | | |
| Flow rate (m³/h) | 6.0 | - | 6.0 | - |
| Conc. of vinyl chloride resin (wt. %) | 48.0 | 48.0 | 45.0 | 45.0 |
| Conc. of residual VCM (wt. %) | 2.50 | 0.15 | 1.78 | 0.07 |
| Feeding of latex to evaporator | | | | |
| Flow rate (m³/h) | 22.0 | 22.0 | 22.0 | 22.0 |
| Diameter of nozzle (mm) | 80.0 | 80.0 | 80.0 | 80.0 |
| Flow speed in nozzle (m/sec) | 1.22 | 1.22 | 1.22 | 1.22 |
| Evaporator pressure (torr) | 110 | 150 | 110 | 150 |
| Saturated steam temp. (° C.) | 52.0 | 60.0 | 52.0 | 60.0 |
| Feed latex temp. (° C.) | 70.0 | 75.0 | 70.0 | 75.0 |
| Level in evaporator (%) | 25.0 | 25.0 | 25.0 | 25.0 |
| Foaming in evaporator | Not | Not | Not | Not |
| Latex after treatment | | | | |
| Conc. of vinyl chloride resin (wt. %) | 48.0 | 48.0 | 45.0 | 45.0 |
| Conc. of residual VCM (wt. %) | 0.15 | 0.02 | 0.07 | <0.01 |
| Frequency of pipe clogging *2 (days) | >800 | >100 | >800 | >100 |

*1 Evaporator: E1 = first evaporator E2 = second evaporator
*2 Frequency of clogging in pipe spanning from ejector to nozzle

TABLE 2

|  | Comp. Ex. 1 | | Comp. Ex. 2 | | Comp. Ex. 3 | |
| --- | --- | --- | --- | --- | --- | --- |
| Evaporator *1 | E1 | E2 | E1 | E2 | E1 | E2 |
| Latex before treatment | | | | | | |
| Flow rate (m³/h) | 6.0 | — | 6.0 | — | 6.0 | — |
| Conc. of vinyl chloride | 48.0 | 48.0 | 45.0 | 45.0 | 48.0 | 48.0 |

TABLE 2-continued

|  | Comp. Ex. 1 | | Comp. Ex. 2 | | Comp. Ex. 3 | |
| --- | --- | --- | --- | --- | --- | --- |
| Evaporator *1 | E1 | E2 | E1 | E2 | E1 | E2 |
| resin (wt. %) | | | | | | |
| Conc. of residual VCM (wt. %) | 2.50 | 0.15 | 1.78 | 0.07 | 2.50 | 0.10 |
| Feeding of latex to evaporator | | | | | | |
| Flow rate (m³/h) | 22.0 | 22.0 | 22.0 | 22.0 | 22.0 | 22.0 |
| Diameter of nozzle (mm) | 80.0 | 80.0 | 80.0 | 80.0 | 80.0 | 80.0 |
| Flow speed in nozzle (m/sec) | 1.22 | 1.22 | 1.22 | 1.22 | 1.22 | 1.22 |
| Evaporator pressure (torr) | 110 | 110 | 110 | 110 | 150 | 150 |
| Saturated steam temp. (° C.) | 52.0 | 52.0 | 52.0 | 52.0 | 60.0 | 60.0 |
| Feed latex temp. (° C.) | 70.0 | 70.0 | 70.0 | 70.0 | 75.0 | 75.0 |
| Level in evaporator (%) | 25.0 | 25.0 | 25.0 | 25.0 | 25.0 | 25.0 |
| Foaming in evaporator | Not | Not | Not | Not | Not | Not |
| Latex after treatment | | | | | | |
| Conc. of vinyl chloride resin (wt. %) | 48.0 | 48.0 | 45.0 | 45.0 | 48.0 | 48.0 |
| Conc. of residual VCM (wt. %) | 0.15 | 0.05 | 0.07 | 0.03 | 0.10 | <0.01 |
| Frequency of pipe clogging *2 (days) | >800 | — | >800 | — | 2 | — |

*1 Evaporator: E1 = first evaporator E2 = second evaporator
*2 Frequency of clogging in pipe spanning from ejector to nozzle Example 2

A vinyl chloride-vinyl acetate copolymer (vinyl chloride 94% by weight) latex, prepared by a micro-suspension polymerization in a polymerization vessel, was treated by an apparatus illustrated in FIG. 1. The copolymer latex was fed to a blow-down tank 2, and the inner pressure of the tank 2 was maintained at 0.3 kg/cm² (gauge pressure). In the tank 2, unreacted vinyl chloride monomer was preliminarily recovered. The copolymer latex thus-obtained contained 45% by weight of a vinyl chloride-vinyl acetate copolymer having an average particle diameter of 1.0 μm, 0.5% by weight of anionic surface active agent, 53% by weight of water and 0.8% by weight of unreacted vinyl chloride monomer (VCM). Thus the amount of VCM based on the weight of the vinyl chloride resin was 1.78% by weight.

By the same procedures as those described in Example 1 and using the evaporators 36 and 136, unreacted vinyl chloride monomer (VCM) was recovered from the copolymer latex 136. As seen from Table 1, the concentrations of VCM in the copolymer latexes collected from the lines 70 and 170 were 0.07% by weight and below 0.01% by weight, respectively, based on the weight of the vinyl chloride-vinyl acetate copolymer. When the frequency of clogging of the feed line spanning from the ejector 38 to the nozzle 46 was evaluated, clogging did not occur over a period of more than 800 days. When the frequency of clogging of the feed line spanning from the ejector 138 to the nozzle 146 was evaluated, clogging did not occur over a period of more than 100 days.

Comparative Example 1

Using the same apparatus as that used in Example 1 (illustrated in FIG. 1), unreacted vinyl chloride monomer (VCM) was recovered from the same polymer latex as that used in Example 1 as follows.

The polymer latex was fed to a blow-down tank 2, and the inner pressure of the tank 2 was maintained at 0.3 kg/cm² (gauge pressure). In the tank 2, VCM was preliminarily recovered. The polymer latex thus-obtained contained 48% by weight of a vinyl chloride resin having an average particle diameter of 1.0 μm, 0.34% by weight of anionic surface active agent, 50% by weight of water and 1.2% by weight of VCM. Thus the amount of VCM based on the 1.2% by weight of VCM. Thus the amount of VCM based on the weight of the vinyl chloride resin was 2.5% by weight.

The inner pressure of the second evaporator 136 was varied to (110±7) torr, i.e., the same as that of the first evaporator 36, and the latex temperature in the ejector 138 of the second evaporator 136 was varied to 70° C. (i.e., the saturated steam temperature (52° C.)+18° C.) (which is the same as the latex temperature in the ejector 38 of the first evaporator 36). All other conditions and procedures remained the same as those employed in Example 1.

When the working conditions became steady state, samples of the polymer latexes were collected from withdrawing lines 70 and 170 and the concentrations of unreacted vinyl chloride monomer (VCM) in the collected polymer latexes were measured. As seen from Table 1, the concentration of VCM in the polymer latex collected from the line 70 was 0.15% by weight (which was the same as in Example 1), but, the concentration of VCM in the polymer latex collected from the line 170 was 0.03% by weight (which was larger than 0.02% by weight in Example 1).

Comparative Example 2

By the same procedures as those described in Comparative Example 1, unreacted vinyl chloride monomer (VCM) was recovered from a polymer latex wherein the same untreated vinyl chloride-vinyl acetate copolymer latex as that used in Example 2 was used as the polymer latex, with all other conditions remaining the same. As seen from Table 1, the concentration of VCM in the copolymer latex collected from the line 170 was 0.03% by weight, i.e., larger than that (below 0.01% by weight) in Example 2.

Comparative Example 3

By the same procedures as those described in Example 1, unreacted vinyl chloride monomer (VCM) was recovered from a vinyl chloride polymer latex wherein the working pressure and working temperature of the first evaporator were varied to the same as those of the second evaporator.

The concentration of VCM in the treated polymer latex was measured in the same manner as in Example 1. As seen from Table 1, the concentration of VCM in the polymer latex collected from the line 70 was 0.10% by weight, and the concentration of VCM in the polymer latex collected from the line 170 was 0.01% by weight, which were smaller than those in Example 1. But, when the frequency of clogging of the feed line spanning from the ejector 38 to the nozzle 46 was evaluated, clogging occurred after about two days due to deposition of polymer.

Industrial Applicability

According to the process of the present invention for recovering low-boiling point substances, unreacted monomers such as unreacted vinyl chloride monomer can be recovered with high efficiency from a foamable polymer latex such as a vinyl chloride polymer latex without substantial use of a defoaming agent and substantial use of a defoaming device, while undesirable foaming is suppressed. The concentration of unreacted monomers in the polymer latex can be lowered to a level lower than the limit of detection based on the state-of-the-art. In the process of the present invention, the polymer is exposed to a high temperature only for a short time, and therefore, the polymer is subject to little or no discoloration.

We claim:

1. A process for recovering low-boiling point substances from a foamable polymer latex wherein a foamable polymer latex containing low-boiling point substances and 0.1 to 4.0% by weight of at least one surfactant selected from the group consisting of anionic surfactants and nonionic surfactants is atomized from a nozzle equipped at the upper part of an evaporator to evaporate the low-boiling point substances for recovery, characterized in that, in a first evaporator maintained at a pressure of 50 to 130 torr, the low-boiling point substance-containing polymer latex is atomized over the surface of a polymer latex retained within the first evaporator, and then, in a second evaporator maintained at a pressure of 100 to 240 torr which is higher than that of the first evaporator, the polymer latex retained in the first evaporator is atomized over the surface of a polymer latex retained within the second evaporator; each of the polymer latexes to be atomized in the first and second evaporators is maintained at a temperature of 10 to 30° C. higher than the saturated steam temperature in the respective evaporator.

2. The process for recovering low-boiling point substances according to claim 1, wherein the polymer latexes are fed toward the first and second evaporators at a flow speed of at least 0.5 m/sec.

3. The process for recovering low-boiling point substances according to claim 1, wherein the pressure of the first evaporator is maintained at 80 to 130 torr, and the pressure of the second evaporator is maintained at 130 to 180 torr.

4. The process for recovering low-boiling point substances according to claim 1, wherein the polymer latex is a vinyl chloride polymer latex.

5. The process for recovering low-boiling point substances according to claim 4, wherein the vinyl chloride polymer latex comprises 30 to 55% by weight of a vinyl chloride polymer containing at least 60% by weight of vinyl chloride monomer units, 68 to 46% by weight of water and 1.0 to 2.5% by weight of low-boiling point substances.

6. The process for recovering low-boiling point substances according to claim 5, wherein the low-boiling point substances include unreacted vinyl chloride monomer.

* * * * *